United States Patent
Field et al.

(10) Patent No.: US 11,178,244 B2
(45) Date of Patent: Nov. 16, 2021

(54) CONTENT DELIVERY NETWORK ROUTING USING BORDER GATEWAY PROTOCOL

(75) Inventors: Brian Field, Centennial, CO (US); Jan Van Doorn, Castle Rock, CO (US); Jim Hall, Centennial, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 554 days.

(21) Appl. No.: 13/569,692

(22) Filed: Aug. 8, 2012

(65) Prior Publication Data

US 2013/0041972 A1 Feb. 14, 2013

Related U.S. Application Data

(60) Provisional application No. 61/521,444, filed on Aug. 9, 2011, provisional application No. 61/616,639, filed on Mar. 28, 2012, provisional application No. 61/652,603, filed on May 29, 2012.

(51) Int. Cl.
  *H04L 29/08* (2006.01)

(52) U.S. Cl.
  CPC .... *H04L 67/2814* (2013.01); *H04L 29/08729* (2013.01); *H04L 67/288* (2013.01); *H04L 67/327* (2013.01)

(58) Field of Classification Search
  CPC .............. G06F 15/173; G06F 12/0897; G06F 12/0875; H04L 45/02
  USPC ........................................................ 709/213
  See application file for complete search history.

(56) References Cited

U.S. PATENT DOCUMENTS

| | | | | |
|---|---|---|---|---|
| 6,011,795 A | * | 1/2000 | Varghese | .......... H04L 29/12132 370/392 |
| 6,829,654 B1 | * | 12/2004 | Jungck | .......................... 709/246 |
| 7,555,561 B2 | * | 6/2009 | Michel | .............. G06F 17/30902 709/218 |
| 7,716,367 B1 | * | 5/2010 | Leighton | ............. H04L 61/1511 709/244 |
| 8,488,470 B2 | * | 7/2013 | Scudder et al. | ............... 370/236 |
| 2002/0021675 A1 | * | 2/2002 | Feldmann | ............... H04L 45/00 370/254 |
| 2002/0075813 A1 | * | 6/2002 | Baldonado | .............. H04L 43/00 370/254 |
| 2002/0184393 A1 | * | 12/2002 | Leddy | ..................... H04L 45/00 709/250 |

(Continued)

OTHER PUBLICATIONS

Y. Rekhter, T. Li, S. Hares, A Border Gateway Protocol 4, Request for Comments: 4271, Jan. 2006.*

(Continued)

*Primary Examiner* — Minh Chau Nguyen
*Assistant Examiner* — Ishrat Rashid
(74) *Attorney, Agent, or Firm* — Banner & Witcoff, Ltd.

(57) ABSTRACT

An announcement protocol may allow disparate, and previously incompatible, content delivery network caches to exchange information and cache content for one another. Announcement data may be stored by the respective caches, and used to determine whether a cache is able to service an incoming request. URL prefixes may be included in the announcements to identify the content, and longest-match lookups may be used to help determine a secondary option when a first cache determines that it lacks a requested content.

20 Claims, 10 Drawing Sheets

(56) References Cited

U.S. PATENT DOCUMENTS

| | | | | |
|---|---|---|---|---|
| 2003/0014540 | A1* | 1/2003 | Sultan | H04L 45/02 |
| | | | | 709/240 |
| 2003/0169689 | A1* | 9/2003 | Chavali | 370/230.1 |
| 2003/0233423 | A1* | 12/2003 | Dilley | H04L 29/06 |
| | | | | 709/214 |
| 2008/0062891 | A1* | 3/2008 | Van der Merwe | H04L 45/04 |
| | | | | 370/254 |
| 2008/0155059 | A1* | 6/2008 | Hardin | H04N 7/17336 |
| | | | | 709/218 |
| 2009/0271708 | A1* | 10/2009 | Peters | G06F 17/24 |
| | | | | 715/738 |
| 2010/0023693 | A1* | 1/2010 | Dilley et al. | 711/118 |
| 2010/0265956 | A1* | 10/2010 | Li | 370/401 |
| 2010/0332595 | A1* | 12/2010 | Fullagar | H04N 21/23103 |
| | | | | 709/203 |
| 2011/0069639 | A1* | 3/2011 | Scudder et al. | 370/254 |
| 2014/0258440 | A1* | 9/2014 | Harvell | G06F 17/30902 |
| | | | | 709/213 |

OTHER PUBLICATIONS

BGP Communities Attribute Request for Comments: 1997 R. Chandra Request for Comments: 1997 cisco Systems P.Traina T. Li.*
Analysis of Web Caching Architectures: Hierarchical and Distributed Caching Pablo Rodriguez Christian Spanner Ernst W. Biersack (Published in IEEE/ACM Transactions on Networking, Aug. 2001).*
Packet Forwarding: Name Based vs. Prefix Based, Craig A. Shue and Minaxi Gupta, 978-1-4244-1697-4/07 2007 IEEE.*
Internet Engineering Task Force, RFC 1771; Y. Rekhter and T. Li; A Border Gateway Protocol 4 (BGP-4); dated Mar. 1995, printed from http://tools.ietf.org/html/rfc1771.

* cited by examiner

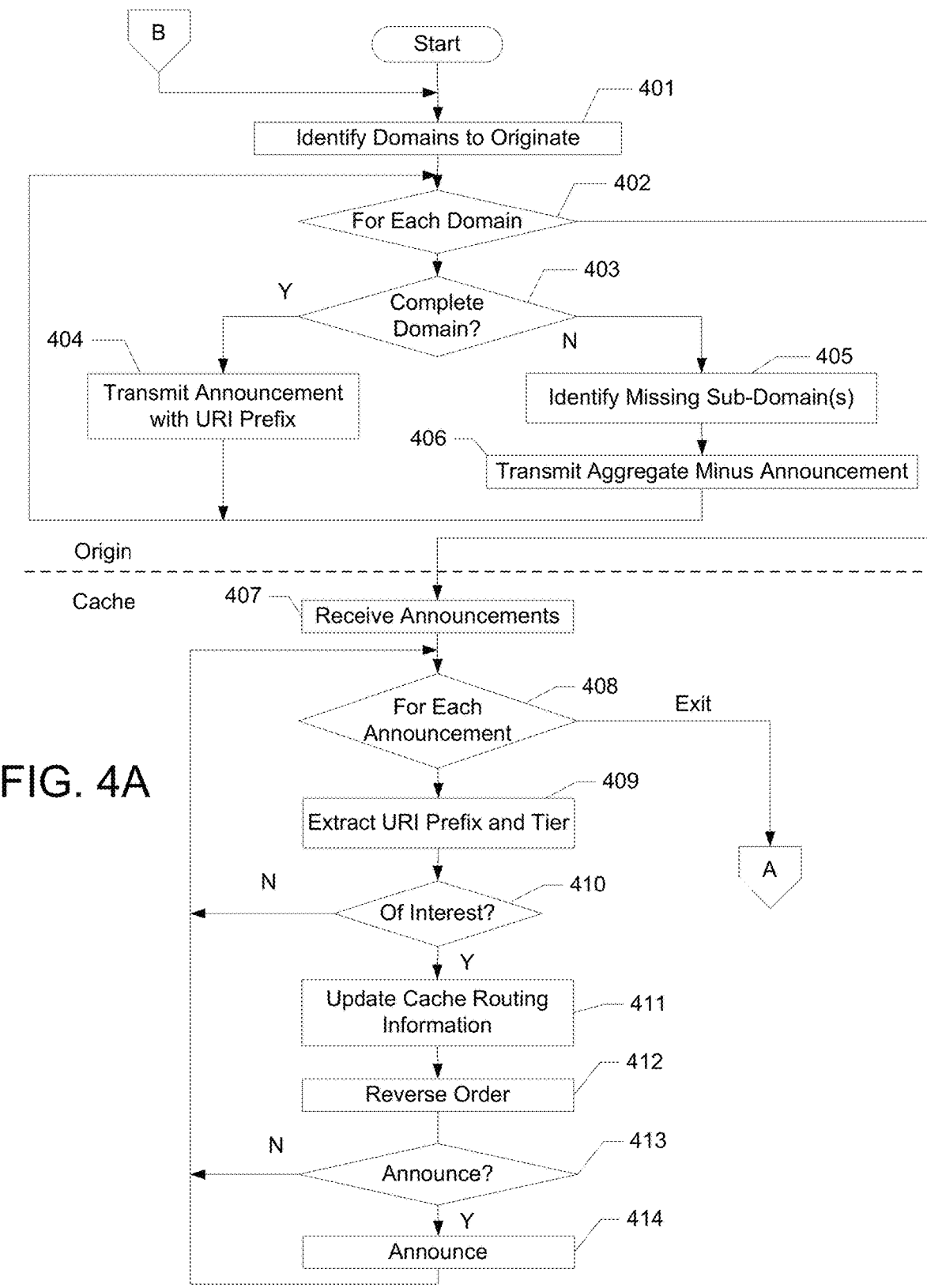

501 502 503 http://www.Comcast.net/sports/basketball -> NH = 24.24.24.0, tier = 0
http://www.Comcast.net/sports/football -> NH = 24.24.18.0, tier = 0
http://www.Comcast.net/sports/football -> NH = 24.18.12.2, tier = 1
http://www.Comcast.net/sports/football -> NH = 24.16.16.0, tier = 2
http://www.Comcast.net/sports/football -> NH = 18.24.12.2, tier = 3
http://www.Comcast.net/sports/soccer -> NH = 24.24.18.0, tier = 3
http://www.Comcast.net/sports/soccer -> NH = 24.24.18.0, tier = 3; (s,g)

FIG. 5A net; Comcast; /sports/basketball -> NH = 24.24.24.0, tier = 0
net; Comcast; /sports/football -> NH = 24.24.18.0, tier = 0
net; Comcast; /sports/football -> NH = 24.18.12.2, tier = 1
net; Comcast; /sports/football -> NH = 24.16.16.0, tier = 2
net; Comcast; /sports/football -> NH = 18.24.12.2, tier = 3
net; Comcast; /sports/soccer -> NH = 24.24.18.0, tier = 3
net; Comcast; /sports/soccer -> NH = 24.24.18.0, tier = 3; (s,g)

FIG. 5B

CONTENT DELIVERY NETWORK ROUTING USING BORDER GATEWAY PROTOCOL

CROSS-REFERENCE TO RELATED APPLICATIONS

The present paper claims priority to U.S. Provisional Patent Application No. 61/521,444, filed Aug. 9, 2011, entitled "Content Delivery Network Routing Using Border Gateway Protocol," and to U.S. Provisional Patent Application No. 61/616,639, filed Mar. 28, 2012, entitled "Integrating Routing with Content Delivery Networks," and to U.S. Provisional Patent Application No. 61/652,603, filed May 29, 2012, entitled "Integrating Routing with Content Delivery Networks," the contents of which are hereby incorporated by reference as an example embodiment of one or more features described herein.

BACKGROUND

Content delivery networks (CDNs) are used to provide content, such as video content, to users. The CDNs typically employ a hierarchy of computer servers, with an origin server that originally supplies the content, and a hierarchy of proxying and/or caching servers organized below (in the hierarchy) the origin to help distribute the content and reduce the load on the origin.

The CDN and its caching servers, however, are proprietary to the content supplier. This means that the caching hardware supporting provider ABC does not cache content for provider XYZ, and cannot help service a request from an XYZ user. Even if it were to do so, the ABC cache has no way to announce what content it will cache for the other proprietary server, and no way to inform the other server of the cache's status (e.g., whether it is active or inactive), due to the proprietary nature of the cache's structure and communications. This proprietary arrangement has been desirable to the content providers, since they retain greater control over the caching of their content, but as more and more content becomes available, and more and more disparate CDNs are implemented, it will be helpful if these disparate and proprietary CDNs can cooperate together.

SUMMARY

Features described herein relate to content delivery network caches. In some embodiments, a cache may store information indicating whether it possesses requested content, and if it does not, the cache may conduct a longest match lookup on a forwarding information database to identify another candidate cache to which the request may be forwarded.

In some embodiments, cache announcement messages may be sent to various cache servers in a content delivery network, each announcement message including a textual resource identifier prefix and address for sender of the announcement. The receiving caches may store a routing information database, mapping textual resource identifier prefixes with corresponding routable addresses. The various textual resource identifier prefixes may be rearranged prior to storage in the routing information database. The rearrangement may place the content in descending hierarchical order for a content delivery hierarchy.

In some embodiments, the textual resource prefix may be a text or alphanumeric string that is not a fully qualified domain name, and the routable addresses may be an Internet Protocol numeric address. The announcement messages may be Border Gateway Protocol announcements.

In some embodiments, the various caches may be segregated to handle different types of content, based on content priority or popularity. Border Gateway Protocol community tags may be used to identify priority levels in the announcement messages.

In some embodiments, the announcements may include announcements identifying a domain supported by the receiving cache, and a sub-domain of the domain that the receiving cache is not to handle.

These features are merely examples, and further features and details are discussed below.

BRIEF DESCRIPTION OF THE DRAWINGS

Some features herein are illustrated by way of example, and not by way of limitation, in the figures of the accompanying drawings and in which like reference numerals refer to similar elements.

FIGS. 5a&b illustrate example forwarding information bases.

DETAILED DESCRIPTION

Figure 1:
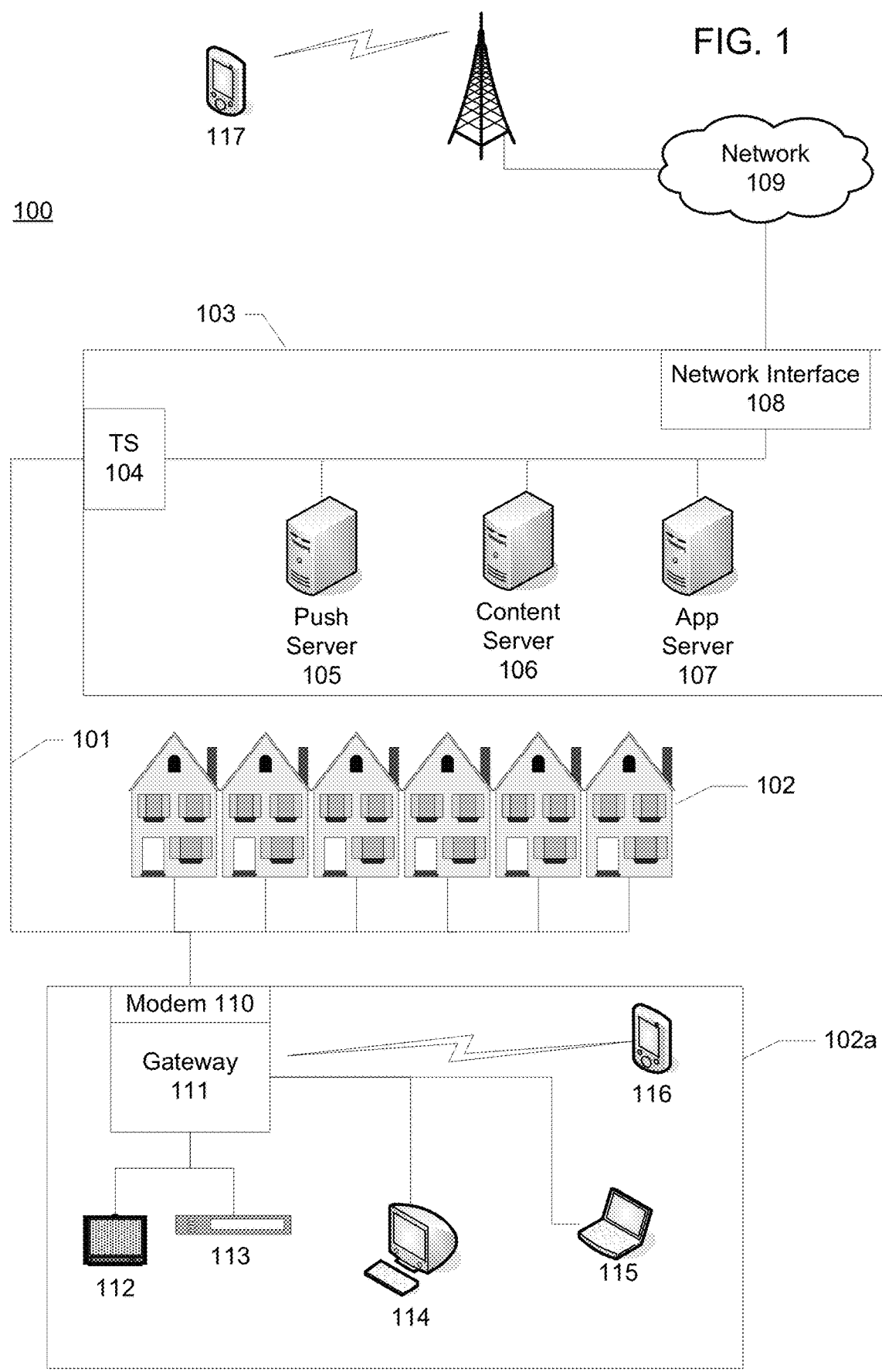
FIG. 1 illustrates an example information distribution network.

FIG. 1 illustrates an example information distribution network 100 on which many of the various features described herein may be implemented. Network 100 may be any type of information distribution network, such as satellite, telephone, cellular, wireless, etc. One example may be a wireless network, an optical fiber network, a coaxial cable network or a hybrid fiber/coax (HFC) distribution network. Such networks 100 use a series of interconnected communication links 101 (e.g., coaxial cables, optical fibers, wireless links, etc.) to connect multiple homes 102 or other user locations to a local office or headend 103. The local office 103 may transmit downstream information signals onto the links 101, and each home 102 may have a receiver used to receive and process those signals.

There may be one link 101 originating from the local office 103, and it may be split a number of times to distribute the signal to various homes 102 in the vicinity (which may be many miles) of the local office 103. Although the term home is used by way of example, locations 102 may be any type of user premises, such as businesses, institutions, etc. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other links, or wireless communication paths.

The local office 103 may include a termination system (TS) 104, such as a cable modem termination system (CMTS), which may be a computing device configured to manage communications between devices on the network of links 101 and backend devices such as servers 105-107 (to be discussed further below). The TS may be as specified in a standard, such as, in an example of an HFC-type network, the Data Over Cable Service Interface Specification (DOCSIS) standard, published by Cable Television Laboratories, Inc. (a.k.a. CableLabs), or it may be a similar or modified device instead. The TS may be configured to place data on one or more downstream channels or frequencies to be received by devices, such as modems at the various homes 102, and to receive upstream communications from those modems on one or more upstream frequencies. The local office 103 may also include one or more network interfaces 108, which can permit the local office 103 to communicate with various other external networks 109. These networks 109 may include, for example, networks of Internet Protocol devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones, or other network devices. For example, the network 109 may communicate with one or more content sources, such as multicast or unicast video sources 110a-b, which can supply video streams for ultimate consumption by the various client devices in the homes 102.

As noted above, the local office 103 may include a variety of servers 105-107 that may be configured to perform various functions. For example, the local office 103 may include a push notification server 105 that can generate push notifications to deliver data and/or commands to the various homes 102 in the network (or more specifically, to the devices in the homes 102 that are configured to detect such notifications). The local office 103 may also include a content server 106 configured to provide content to users in the homes. This content may be, for example, video on demand movies, television programs, songs, text listings, etc. The content server may include software to validate user identities and entitlements, locate and retrieve requested content, encrypt the content, and initiate delivery (e.g., streaming) of the content to the requesting user and/or device.

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server 107 may be used to implement a cache server for the content found on the content server 106. Other example application servers may be responsible for collecting data such as television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the homes 102. And as will be discussed in greater detail below, another application server may be responsible for receiving user remote control commands, and processing them to provide an intelligent remote control experience.

An example home 102a may include a device 111, such as a modem, which may include transmitters and receivers used to communicate on the links 101 and with the local office 103. The device 110 may be, for example, a coaxial cable modem (for coaxial cable links 101), a fiber interface node (for fiber optic links 101), or any other desired device having similar functionality. The device 111 may be connected to, or be a part of, a gateway interface device 112. The gateway interface device 112 may be a computing device that communicates with the device 111 to allow one or more other devices in the home to communicate with the local office 103 and other devices beyond the local office. The gateway 112 may be a set-top box (STB), digital video recorder (DVR), computer server, or any other desired computing device. The gateway 112 may also include (not shown) local network interfaces to provide communication signals to devices in the home, such as televisions 113, additional STBs 114, personal computers 115, laptop computers 116, wireless devices 117 (wireless laptops and net-books, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others. Any of the devices in the home, such as the gateway 112, STB 114, computer 115, etc., can include an application software client that can make use of the video images captured by the image capture servers.

Figure 2:
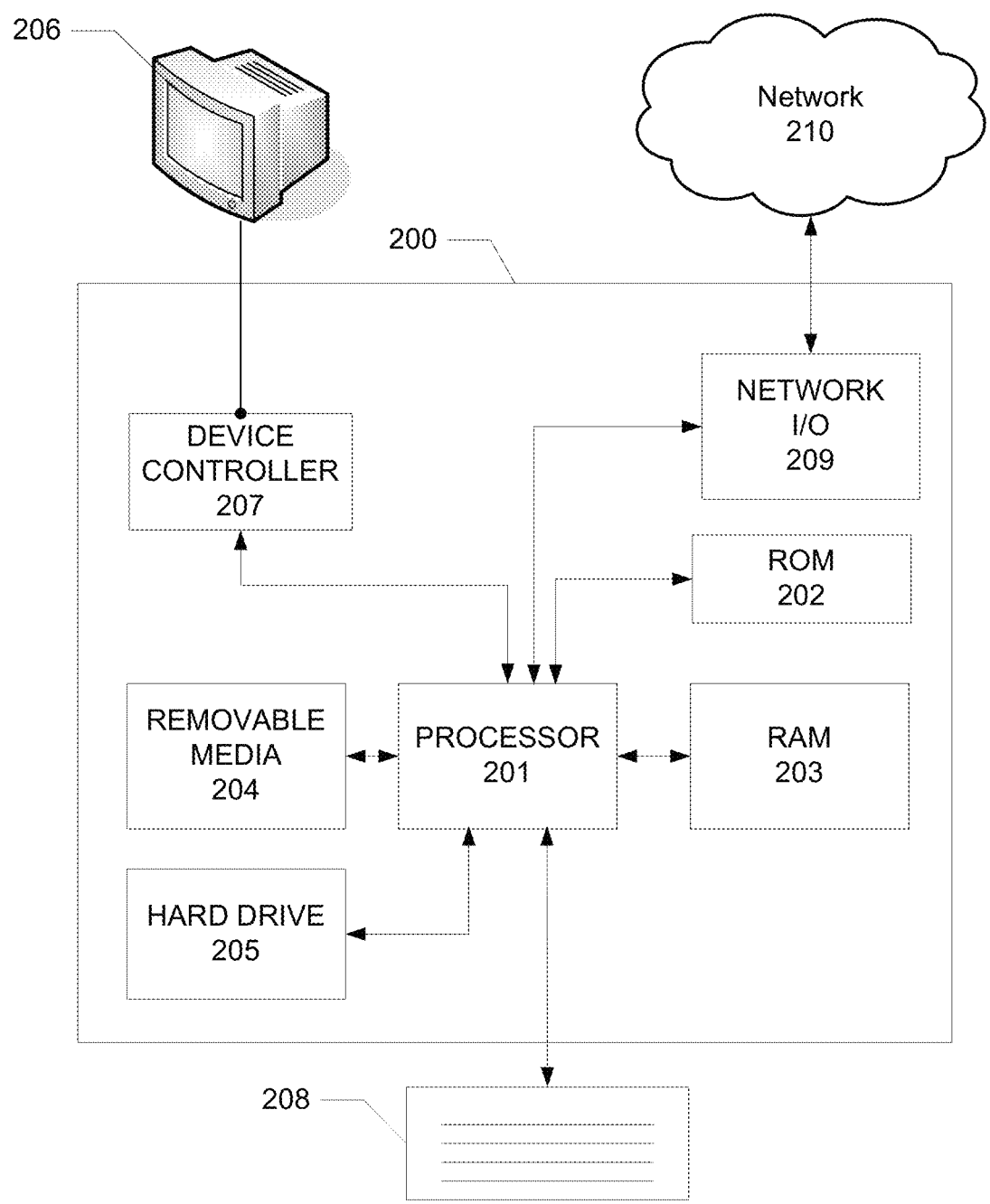
FIG. 2 illustrates an example hardware or software platform on which the various elements described herein can be implemented.

FIG. 2 illustrates general hardware elements that can be used to implement any of the various computing devices and/or software discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, hard drive, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication links 101 discussed above, the external network 109, an in-home network, a provider's wireless, coaxial, fiber, or hybrid fiber/coaxial distribution system (e.g., a DOCSIS network), or any other desired network.

Various features described herein offer improved remote control functionality to users accessing content from the local office 103 or another content storage facility or location. For example, one such user may be a viewer who is watching a television program being transmitted from the local office 103. In some embodiments, the user may be able to control his/her viewing experience (e.g., changing channels, adjusting volume, viewing a program guide, etc.) using any networked device, such as a cellular telephone, personal computer, personal data assistant (PDA), netbook computer, etc., aside from (or in addition to) the traditional infrared remote control that may have been supplied together with a television or STB.

Figure 3A:
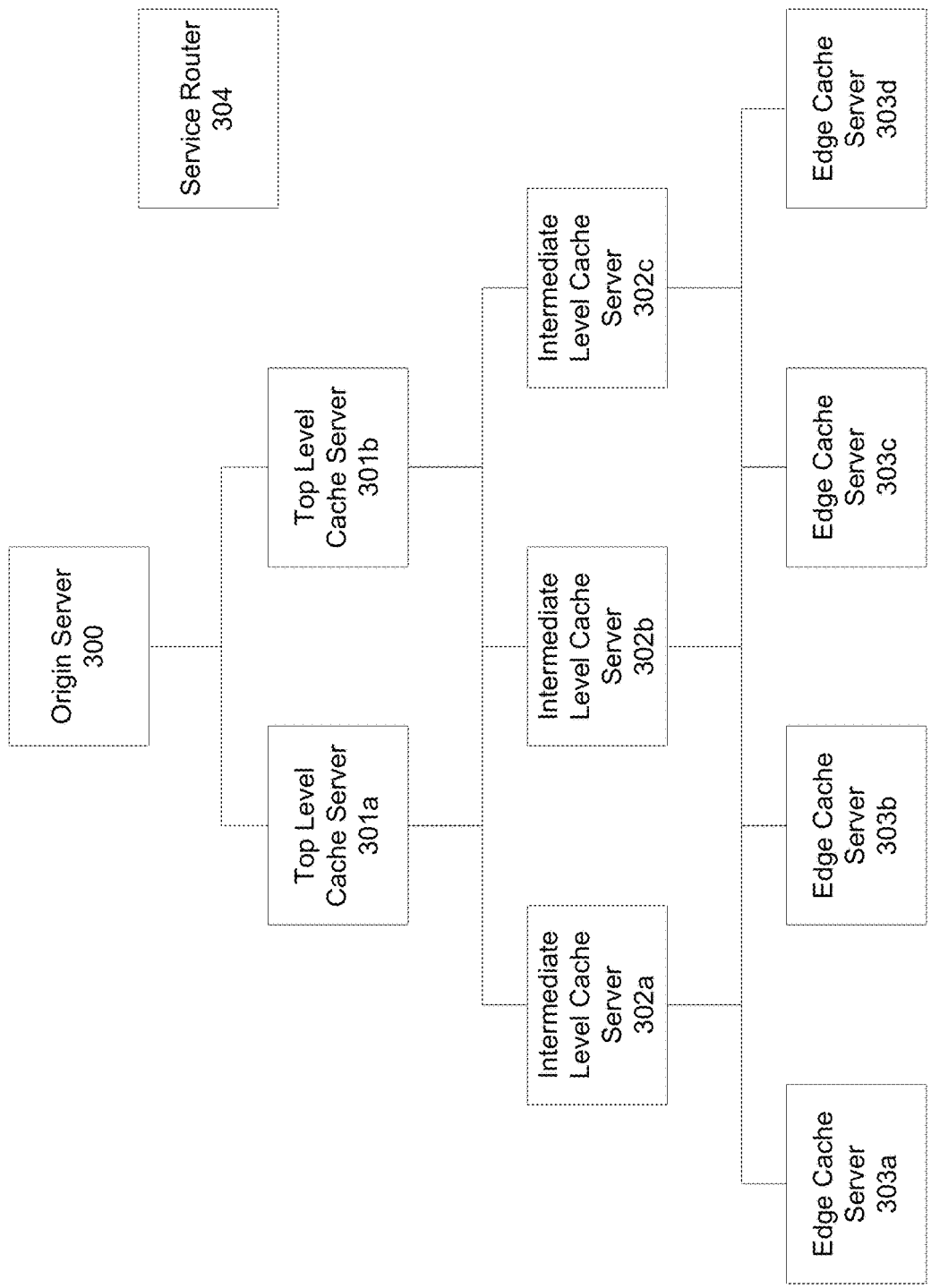
FIG. 3a illustrates an example logical hierarchy for a content domain.

FIG. 3*a* illustrates an example distribution hierarchy of caching servers for an example CDN. The hierarchy of caching servers may be used to help with the distribution of online content by servicing requests for that content on behalf of the content's source. At the top of the hierarchy is origin server 300. The origin server 300 may be a server that provides one or more pieces of content of a content provider. For example, origin server 300 may be implemented using content server 206 with the hardware from FIG. 2, and can supply a variety of content to requesting users and devices. The content may be any type of media or data such as, for example, movies available for on demand access by clients (not shown), and the origin server 300 for a movie may be a server that initially makes the movie available. The origin server 300 may also be responsible for establishing the caching hierarchy that will be used to distribute its content. For example, the server 300 may transmit messages to one or more cache servers, requesting that the cache servers assist in caching the origin server's content, and instructing the cache server as to where that cache server should be in the hierarchy for the origin's content domain(s), what domain(s) of content it should (or should not) cache, access restrictions, authentication requirements for granting access, etc. In some embodiments, individual cache servers may be configured to reside in different tiers of the hierarchy as needed, for example, to maintain security. The caches may also be configured to use the BGP community attribute for assistance with hierarchy announcements. For example, when making a URI (uniform resource identifier) prefix announcement, an origin server can send a BGP community value, and the cache servers can be preconfigured to identify the BGP communities that are of interest to each respective cache, and to process the announcements containing the BGP community values of interest (while ignoring or discarding announcements having BGP values that are not of interest). Additionally, in some embodiments, the various cache servers may be configured to handle BGP communities, and the origin server might simply transmit announcements with the community values (without necessarily instructing the caches to cache the content).

To facilitate distribution of the content, one or more top level cache servers 301*a-b* can be communicatively coupled to the origin server 300, and each can store a copy of the file(s) containing the content of the origin server 300 (e.g., a copy of the movie files for an on-demand movie). These top level servers can be co-located at the same premises as the origin server 300 and implemented as application servers 107, or they can be located at locations remote from the origin server 300, such as at a different local office connected to the network 109. The top level cache servers 301*a-b* may also receive and respond to client requests for the content. Further down in the hierarchy may be one or more intermediate level cache servers 302*a-c* and edge cache servers 303*a-d*, and these may be implemented using the same hardware as the cache servers 301*a-b*, and can be configured to also receive and respond to client requests for content. Additional layers of caches in the hierarchy may also be used as desired, and the hierarchical arrangement allows for the orderly distribution of the content, updates to the content, and access authorizations. For example, lower level servers may rely on higher lever servers to supply source files for the content and to establish access authorization parameters for the content. In some embodiments, the top and intermediate level servers may refrain from interaction with clients, and may instead limit their content delivery communications to communicating with other servers in the distribution network. Limiting client access to just the lowest level, or edge, servers can help to maintain security and assist with scaling.

The CDN may also include one or more service routers 304, which may be communicatively coupled to all of the cache servers, but which need not be a part of the caching hierarchy. The service router 304 may facilitate communications between the members of the hierarchy, allowing them to coordinate. For example, the servers in the hierarchy may periodically transmit announcement messages to other cache servers, announcing their respective availabilities (e.g., announcing the content that they are able to provide, or the address domains or routes that they support). In some embodiments, the caches may simply transmit a single announcement to a service router 304, and the service router 304 may handle the further distribution of the announcement messages to other servers in the hierarchy. In this manner, the service router 304 may act as a route reflector in the Border Gateway Protocol (BGP), reducing the amount of traffic passing directly between the caches.

FIG. 3*a* illustrates a logical hierarchy for a given domain of content, from its origin 300 (e.g., a server storing the original copy of a particular video asset) down through layers of caches. Each individual piece of content can have its own hierarchy, however, and a single server computing device can play different roles in the hierarchies for different pieces of content. So, for example, while a first computing server device can act as the origin 300 for a first piece of content (e.g., videos from "ESPN.COM"), that same server device can act as an intermediate-level cache 302*b* for a different piece of content (e.g., videos from "NBC.COM").

Figure 3B:
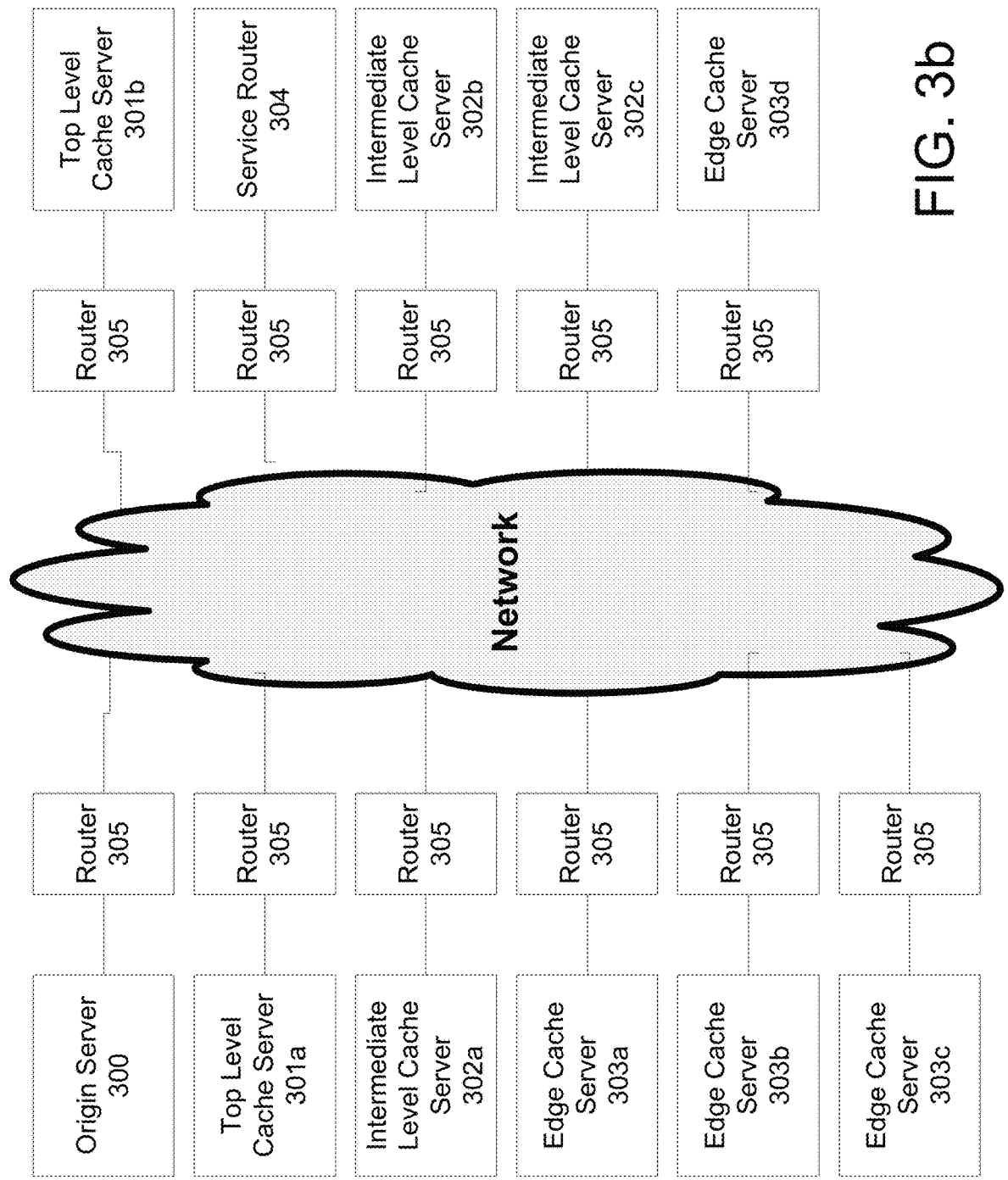
FIG. 3b illustrates an example physical arrangement for the hierarchy.

Indeed, the physical arrangement of the servers need not resemble FIG. 3*a* at all. As illustrated in FIG. 3*b*, each of the cache servers may be coupled through its own corresponding router 305 to one or more communication network(s). The routers 305 may contain the necessary routing tables and address information to transmit messages to other devices on the network, such as the other caches, client devices, etc.

FIGS. 4*a*&*b* illustrate an example process for managing the various caches in the hierarchy. The process may be performed by any of the origin or server caches.

In step 401, the server may determine which domains of content it will originate or supply to other caches in a hierarchy. A domain of content can be a single piece of video (e.g., a particular movie), an Internet domain of content (e.g., all content from the website www.nbc.com), or any other desired data. This determination can be performed in a variety of ways. For example, a user or administrator can access the server and upload content that will be distributed through a hierarchy. In some embodiments, the domains of an origin can be derived from the web server configuration.

As part of step 401, the server may also determine what domains of content it will cache for others. This determination can also be established by a user or administrator, who may manually enter identifications of one or more domains that are to be cached by the server. The various domains to be supported may be identified by a textual domain name (e.g., "nbc.com"), or any other desired identifier.

In step 402, the server can begin a looping process for each domain of content that the server is to originate. For each such domain, the server can first determine in step 403 whether the server will be serving as an origin for the entire domain. In some embodiments, a particular domain may offer multiple pieces of content, and a user or administrator may determine that a subset of that content should be offered from a different point of origin from the other content of the domain. For example, the domain "comcast.net" may offer a variety of sports videos available for on demand streaming from sub-domains, such as basketball videos available at "www.comcast.net/basketball," football videos available at "www.comcast.net/football," and soccer videos available at "www.comcast.net/soccer," all of which may be sub-domains of the "www.comcast.net" domain. A cache server may initially be configured to support the entire "www.comcast.net" domain, but if one particular sub-domain becomes heavily used (e.g., the basketball sub-domain may become highly popular during the NBA playoffs), then for load balancing purposes, the administrator may instruct that cache server to cease (or otherwise limit) its handling of requests to that heavily-used sub-domain, and establish a different cache server for handling the heavily-used sub-domain.

If the server is configured to serve as the origin for the entire domain, then the process can proceed to step 404, and the server can transmit one or more announcement messages regarding its support for this domain. These announcements can be Border Gateway Protocol route announcements, and can include several pieces of information that may entail a modification to existing Multi-Protocol BGP formats that adds a new AFI (address family identifier). One piece may be a uniform resource identifier (URI) prefix identifying the domain that the announcing server supports. This URI prefix can be a textual name identifying the domain (e.g., "Comcast sports"). If the domain includes more than one layer of content (e.g., subdirectories of content), then the URI prefix can contain an ordered identification of the supported domain. For example, the URI prefix can be arranged in a left-to-right order, with higher levels in the domain appearing on the left. The following may be an example URI prefix indicating a the "Player News" domain of content, which is a sub-domain of the "Washington Wizards" domain of content, which is a sub-domain of the "NBA" domain of content, which is a sub-domain of the "basketball" domain of content, which is a sub-domain of the "Comcast sports" domain of content:

"comcast_sports/basketball/nba/washington_wizards/
player_news"

Although the example URI prefix uses text and the forward slash '/' to indicate sub-domain relationships, other forms of notation may be used. For example, the domain name can be represented in an order that increases in specificity from left to right (or vice versa if desired), such as the following:

"net.comcast_sports.basketball.washingtonwizards/players/
John_Wall"

The announcement may also include a tier identifier, indicating the server's position in the caching hierarchy for the identified domain. Levels in the hierarchy may be identified by number (e.g., level zero, level one, level two, etc.), where the zero value is the origin, and the successive numbers indicate sequential layers below the origin in the hierarchy. So, using the FIG. 3 example, origin server 300 is tier zero, top level cache 301a is tier one, intermediate level cache 302a is tier two, and edge cache 303a is tier three. The example tier numbers need not be successive, and can be in any format that can permit identification of relative leveling between caches. So, for example, the tiers in a hierarchy can be identified as level 0, level 50, level 100 and level 150.

The announcement may also include an address identifier (e.g., an Internet Protocol—IP address) of the cache server making the announcement. This identifier can contain routing information to indicate how the server can be contacted. This address can be, for example, a dotted-decimal internet protocol (IP) address for the server, or for the router 304 that handles the server's communications. The announcement can announce domains of any desired size, such as an overall aggregate domain (e.g., http://comcastnet) and/or a more specific domain (e.g., http://comcast.net/basketball).

If the server handles the entire domain, then in step 404, the server can transmit its announcement message with the URI prefix discussed above. To do so, the server may send its message to its associated router for distribution across the network to the other cache servers in the domain's hierarchy, and/or to a service router 304 for redistribution to the other caches in the hierarchy.

If the server only handles a portion of a domain, then in step 405 the server may determine which sub-domain(s) it is not going to handle. This determination may be made based on information received, for example, from an administrator or the origin server 300. For example, the origin server 300 may have transmitted a message to a cache server, indicating that the server should be a level 3 cache for the "www.comcast.net" domain, but that the server should exclude (and not cache) the content from the "www.comcast.net/basketball" subdomain. In such an embodiment, the origin 300 may have instructed a different cache server to handle just that basketball sub-domain, and none of the other sub-domains at "www.comcast.net." As noted above, this may be done for load balancing reasons.

After determining the sub-domain(s) that the server is not handling, the server may then proceed to step 406, and transmit an aggregate minus announcement. The aggregate minus announcement may include the same URI prefix, tier and address information found in the step 404 announcement, but may also be accompanied by a negative announcement identifying the one or more sub-domains that are not handled by the cache server.

After transmitting its announcements, the server may proceed to step 407, and determine what announcements it has received. Although this sequence is described as an example, any of the steps herein may be rearranged as desired to be performed in a different order, to be performed in parallel, or to omit or otherwise rearrange the sequence described herein. The announcements may be received as messages from another server (via intermediate routers), or as reflected announcements from the service router 304. Additionally, in some embodiments the previous steps may be performed by an origin server (or upper level server), while steps 407 and beyond may be performed by a cache server (or lower level server).

Each received announcement, like the transmitted announcements discussed above, may identify a cache server that sent the announcement, the URI prefix for a domain of content that is serviced by the cache server that sent the announcement, and a tier value indicating what level the sending cache is in the cache hierarchy for the identified domain. In step 408, the server may begin a looping process to handle each received announcement. For each announcement, the server may first extract the URI prefix and tier values from the announcement.

The server may then determine in step 410 whether the announcement is of interest to the receiving server. An incoming announcement may be of interest if the identified domain is one that the server is configured to support (e.g., if the server had been previously informed by the origin, or an administrator, to participate in the caching hierarchy for a content domain). The cache server may store a listing of domains or BGP communities that it is to support, as well as an identification of the server's assigned tier in the domain's hierarchy (e.g., if the server was asked to be a level 2 cache for the "www.comcast.net" domain). To make this determination, the receiving server may compare the URI prefix with those stored in the server's listing of domains to support, and determine if there is a match (e.g., a matching textual value in the server's listing). If there is a match, the receiving server can also determine whether the tier of the announcing server is of a lower number (e.g., higher in the hierarchy, or closer to the origin than the receiving server) than the receiving server. In some embodiments, servers may be configured to ignore announcements from caches that are at a lower level in the hierarchy (e.g., those having a higher numeric tier value, or those that are farther from the origin), to avoid circular cache references in later handling of requests for content. In some embodiments, the cache may receive multiple announcements from different higher-level servers, and the cache may prioritize the announcements according to which sending server is closest in hierarchy level to the receiving cache. For example, if a receiving level 100 cache receives announcements from a level 20 cache and a level 50 cache, the receiving level 100 cache may give the level 50 cache priority, since it is closer in level. Prioritizing the level 50 cache may result in, for example, determining that the level 20 cache's announcement is no longer of interest.

If the announcement is not of interest to the receiving server (e.g., it is for a domain that the caching server is not required to cache, or it is from a server at a lower level in the hierarchy for that domain), the server can simply return to step 408 to process the next received announcement.

If the announcement is of interest to the receiving server, then in step 411, the receiving server may update a database file, such as its cache routing information base (RIB), with information from the announcement. The RIB may store a series of entries for different domains of information that are supported by the cache, each entry identifying the domain of information by its URI prefix (or a textual name), a different cache server that also supports the domain, and a tier identifier of that other server. The RIB identifies next hop destinations for each listed domain, providing path information for obtaining the domain's content when servicing a client request for the content (discussed below).

FIG. 5a illustrates an example of the information in such a RIB. As illustrated, the RIB may include the textual URI prefixes 501 for the various domains supported by the server and for which announcements have been received. The RIB may also include next hop routing information 502 identifying the server that sent the announcement for each listed URI prefix. The RIB can also include a tier identifier 503, identifying the listed server's tier in the hierarchy for the listed domain. In the FIG. 5a example, the first listing identifies the domain for "www.comcast.net/sports/basketball," and indicates that the origin (tier 0) server is found at the address 24.24.24.0/16.

When updating the cache server's routing information, the server may reverse the order of some of the information in the URI prefix in step 412. As noted above, the URI prefix may be textual, and may identify content domains and sub-domains in a predefined order (e.g., left to right). The orderly listing of the URI prefix information may help simplify the matching process when the cache is asked to provide content it supports but does not possess (described below). In some embodiments, the received URI prefix might not be in this predefined order. For example, a common URI may be of the form of a fully-qualified domain name such as "www.Comcast.net/sports." In that notation, the URI contains elements that are not in a left-to-right hierarchy for matching purposes. For example, the protocol indicator (www) may be unnecessary, and the ".net" top level domain may be a higher level match than the "comcast" host. To support looking for a left-to-right text match, it may be beneficial to rearrange the URI prefix elements. For example, the top level domain (".net") may be placed first, with the host ("comcast") next, followed by the folder information ("/sports"), and the protocol identifier (www) may be omitted. The resulting reordered URI prefix may appear as shown in FIG. 5b, in which case the URI prefixes 501 have been revised. With the revised ordering, a left-to-right keyword match can be performed when a client request arrives, and the best match can be more easily identified (as will be discussed further below).

After all of the incoming announcements have been processed, the server may proceed to step 413, and determine whether the received announcements should be further announced or propagated down the hierarchy. If so, the server may proceed to step 414, and transmit the announcement further downstream to one or more servers that are under the server in the hierarchy.

The server may then proceed to step 415, and perform path selection processing on the RIB to form a forwarding information base (FIB). The path selection processing may involve application of routing rules and preferences to help ensure that the most appropriate route(s) appear in the FIB. For example, the path selection process can remove duplicate entries in the RIB. As another example, if two announcements are received from level 2 caches, then the path selection process may involve deciding which of the two announcements should be retained in the FIB. The selection of an announcement can depend on various factors. For example, if the sending cache of one announcement is of slower processing capability than the sender of the other, then the first sending cache may be selected, and its announcement information may be selected for retention in the FIB.

Another factor may be the length of a physical connection between two caching servers. The length may include the number of intermediate routers and network legs, and the path selection process may prefer a shorter path. Similarly, the path selection process can determine whether the incoming announcement was an interior border gateway protocol (iGBP) or exterior border gateway protocol (eBGP) announcement, with interior ones given preference over exterior ones (or vice versa). For example, servers may be located within a common domain, and announcements between them may be considered "local", as compared to announcements arriving from different domains. Along these lines, the cluster list length for a given server may also be akin to this path length, and the server with the shorter cluster list length may be the one chosen.

Another factor may be the cost (financial and/or time) associated with accessing the respective caches that sent the announcements. The path selection process (conducted by the cache server on its RIB) can select the least cost route. Other business rules can be used as well.

Another factor may be the time at which an announcement was received. For example, in some embodiments, if two announcements are received from external servers (e.g., cache servers that are not located in a common domain as the receiving server), then the announcement that was received first may be the one chosen.

When the path selection processing is completed, the resulting edited RIB is a FIB (the two can be maintained as separate databases, if desired), the process can proceed to step 416 to begin a looping process to update the contents stored in the cache server's memory. The loop may process each domain listed in the FIB, and in step 417, the cache server can determine whether it needs to update the information it has stored (if any) for the identified domain. To make this determination, the server can check to see if it stores any information for that domain, and if it does, the server can determine when that information was most recently updated. That time of most recent update can be compared with a time-to-live value or expiration date for the content (which could have been supplied along with the content at the time of the last update), and an update can be needed if the time since the last update exceeds the time-to-live. An update can also be needed if, for example, the cache server does not possess any information for the identified domain.

If an update is needed, then the cache server can consult the FIB to identify the next hop address for the domain, and transmit a request in step 418 to that next hop server, requesting a fresh download of the domain content. If multiple next hops are listed in the FIB for a given domain (e.g., the FIG. 5a example lists the origin and 3 tiers of next hops for the "www.comcast.net/sports/football" domain, the server may be configured to only issue an update request to the tier that is closest in level to the server (e.g., if the server is a level 4 cache for the domain, then it might only issue an update request to the level 3 cache). In some embodiments, the server may be configured to follow a predefined protocol when requesting updates, where the protocol can identify which cache level(s) the server should attempt, and in what sequence.

The looping process from step 416 can be, like the other steps, optional. In some embodiments, the updating of the cache need not occur for all FIB entries as illustrated, and instead may occur at different intervals. For example, some embodiments may simply update the cache content when a client request is received and if, at that time, the cache determines that its stored version of that content is outdated.

When the desired updating is completed, the server may proceed to step 419, and determine if a new request for content has been received. The request can be received from a client device, another cache (e.g., a lower-level cache in a domain's hierarchy), or any other computing device.

If a request has been received, then the server can proceed to step 420, and extract the URI prefix found in the content request. The URI prefix can be included when a client device or cache issues a request for a particular domain of content.

In step 421, the cache server can determine whether its memory contains a copy of the requested content. If it does, then in step 422 the server can return a copy of the requested content to the requesting device, and the server can return to step 419 to process the next request.

If the content was not found in the cache server's memory, then the server may proceed to step 423, and conduct a search through the FIB to find the best matching entry. To do so, the server can use the URI prefix extracted from the request, and conduct a text search through the FIB, looking for a match in the URI prefix entries. The search may be conducted in the same left-to-right hierarchy used to express the URI prefixes, such that higher domain level matches occur before lower domain level matches. After checking all of the entries in the FIB, the server can identify the best match by determining which entry matched the leftmost URI text, and matched the furthest to the right of the URI text, or which entry had the longest match from the left. As noted above, the left-to-right orientation is merely an example, so other embodiments can arrange or rearrange the URI text in any desired order (e.g., right-to-left).

In step 424, the best matching entry can be checked to determine if the next hop address is a multicast address. In the FIG. 5a example, the last entry was a multicast address, as indicated by the "(s, g)" notation.

If the best match was not a multicast address, then the server can proceed to step 425, and can forward the content request to the cache server that had the best matching URI prefix. That cache server can service the request, and pass a response back to the server that forwarded the request, which in turn can respond to the requesting client or device.

If the best match was a multicast address, then the server can proceed to step 426, and return the best match multicast address to the requesting device or client. The requesting device or client may then send a request to join the multicast stream.

With the features above, various advantages may be achieved. For example, formerly incompatible CDNs can be rendered compatible, if they are configured to use the URI prefix notation for content. Reallocation of caching resources can also be more easily accomplished. If a particular sub-domain of content becomes popular, the origin may simply instruct one or more caches to focus on that sub-domain, and those caches can send corresponding announcements to, for example, limit their support for this domain to just the popular sub-domain.

Other variations may be made as well. For example, the example path selection process above discusses the selection of a single path or RIB entry between identical announcements (or different servers supporting the same domain at the same hierarchy level). In alternative embodiments, the server can be configured to retain multiple entries as backups, or define a network inefficiency range value (X) that would allow a less-than-ideal announcement (e.g., perhaps its path length is slightly too long when compared to a preferred length) to still be retained if it was within a predefined range (X) of the desired value. Similar inefficiency ranges may be defined for the other factors as well (e.g., financial cost, acceptable time delay, etc.). Additionally, the use of these inefficiency ranges can be activated or deactivated, depending on how popular a domain may be. For example, if a cache server receives more than a predetermined minimum number of requests for a particular domain, it may be best to retain one or more backup RIB entries.

In some embodiments, the announcement messages may be used as a health check. The receiving cache can use a timer to measure the time between announcements, and compare the measured time to a predetermined minimum (e.g., 1 minute, 10 minutes, etc.). If an announcement is not received before the time period passes, the receiving cache may transmit an inquiry to re-activate the sending cache, or to alert an administrator or other device that a cache may be down.

In some embodiments, the origin for a particular piece of content might not be located on the same CDN as an edge cache that is servicing a client request for content, and is instead located on a remote CDN. That remote CDN can transmit an identification of a set of its edge caches to the client' local CDN, and the identified remote CDN edge caches can be treated as implied origins by the servers in the local CDN.

Figure 6:
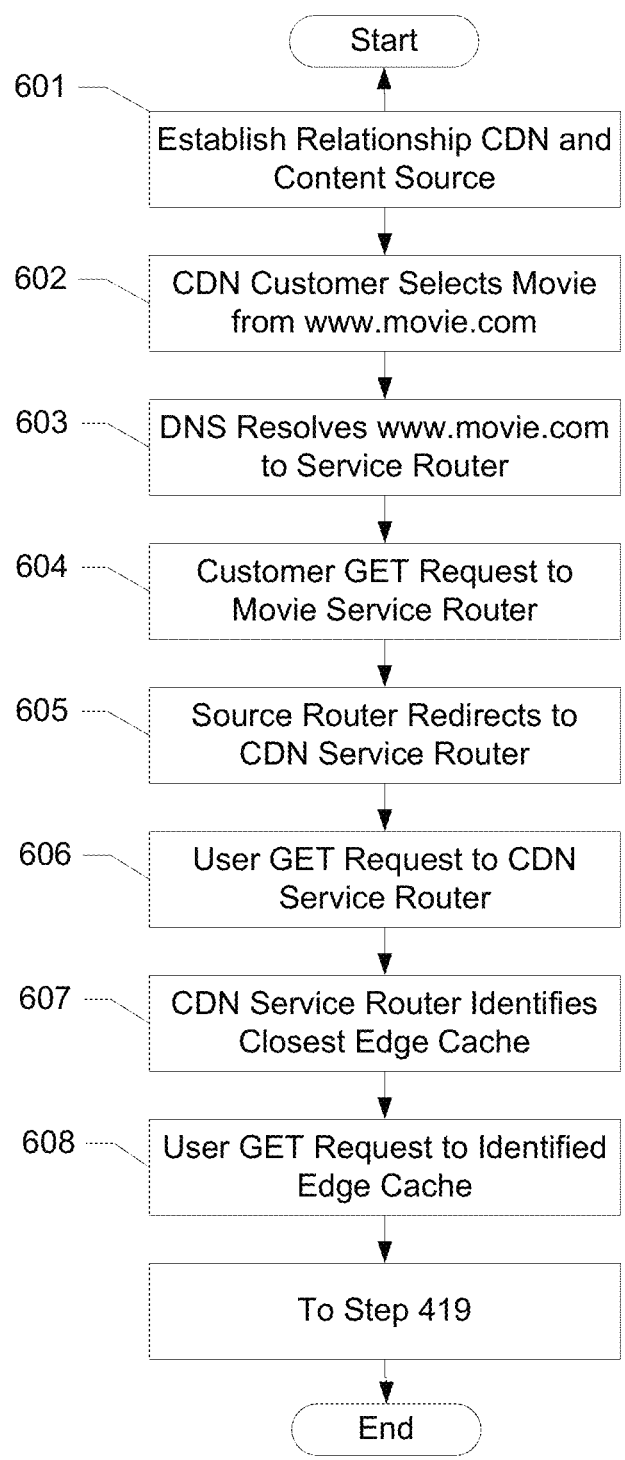
FIG. 6 illustrates an example process flow for handling a client request for content.

FIG. 6 illustrates an example process by which a content request can be generated. In step 601, a content source (e.g., a movie download service) may establish a relationship with a CDN (e.g., an Internet Service Provider). In step 602, a user of the CDN may peruse the source's website, and make a selection of the movie "Superman." The selected movie may have a link for its manifest file, such as "http://source.movie.com/movies/superman/manifest."

In step 603, the link for the manifest file may be resolved, via domain name server (DNS) lookup by the user's CDN, to a service router for the content source. In step 604, the user's device may establish a TCP (Transport Control Protocol) session with the content source's service router, and issue a GET request for the manifest using the link above.

In step 605, the content source service router may consult the IP address of the user's device, and determine that the user is associated with the CDN. The content source service router can then redirect the user's request to a service router of the CDN, passing it the link above (or having the customer's device pass this in a new request to the CDN service router).

In step 606, the user's device may establish a TCP session with the CDN service router, and issue another GET request for the movie manifest, with the link: "http://source.movie.com/movies/superman/manifest" as a passed value.

In step 607, the CDN service router consults its stored listing of announcements, and identifies a set of edge caches that have announced a URI prefix that covers the requested asset, and finds the one that is closest to the customer. The CDN service router can inform the customer's device of the address for the closest edge cache.

In step 608, the user's device may open a TCP session with the identified edge cache, and request the movie manifest. That edge cache can take the fully qualified domain name for the requested manifest, and check its FIB to find a match, as discussed above from step 419.

The announcements above included the URI prefix, next hop address and tier information, but additional information can be included as well. For example, the announcement can indicate whether the server is a multicast server. The announcement can also include health information for the sending cache, such as a status value (indicating whether the cache is out of service), a prefix level (available or out of service). Parent cache information can be included as well. For example, and intermediate cache's announcement can also announce one or more entries from its own FIB for a given domain of content.

In some embodiments, fully qualified domain names can be used as URI prefixes, but in alternative embodiments, these URI prefixes can be a shortened form to reduce bloat. For example, a URI prefix for the movie "Superman" could simply be "comcastmoviesuperman."

Figure 4B:
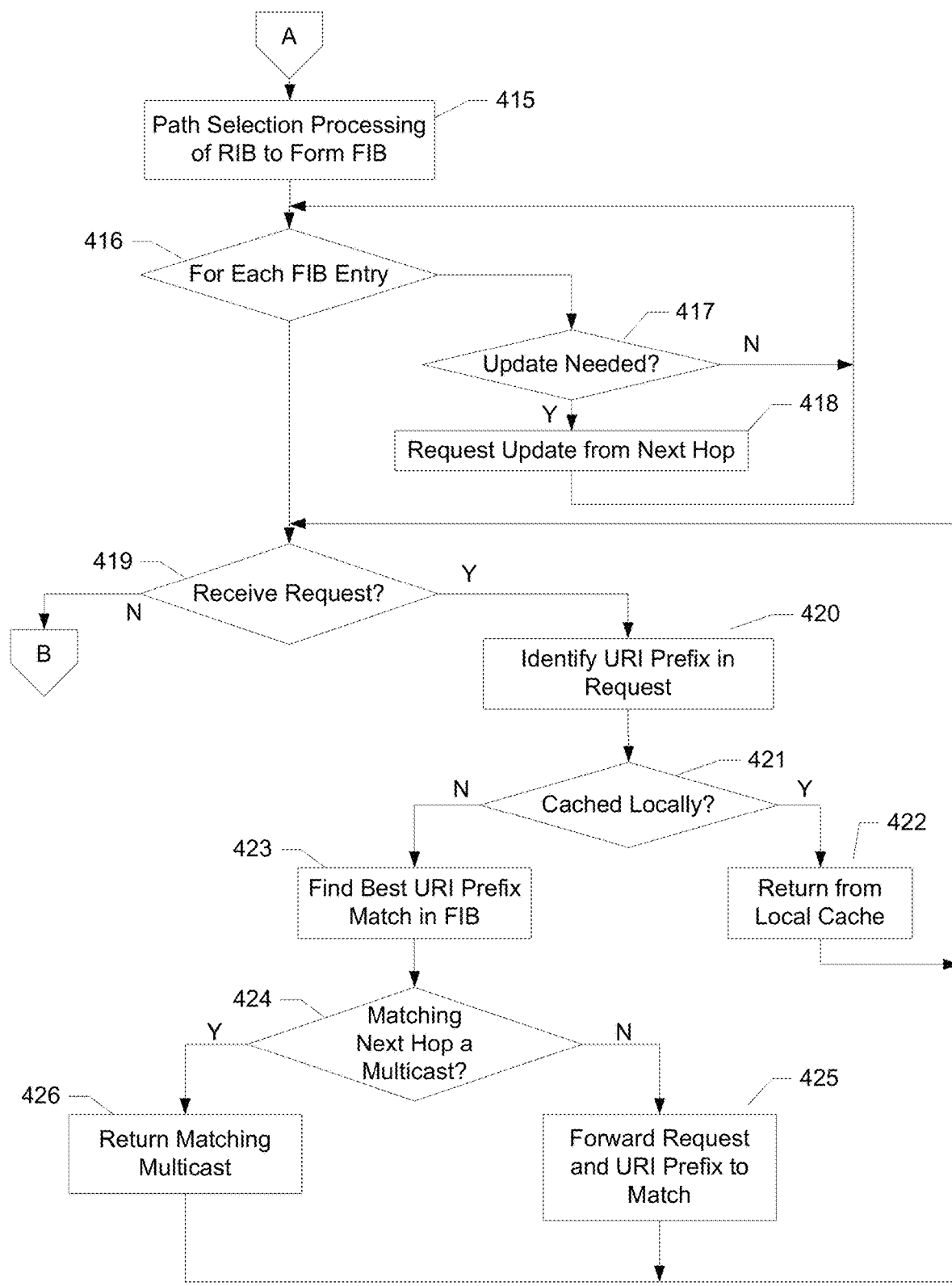
FIGS. 4a&b illustrate an example process for managing a cache hierarchy.
Figure 7:
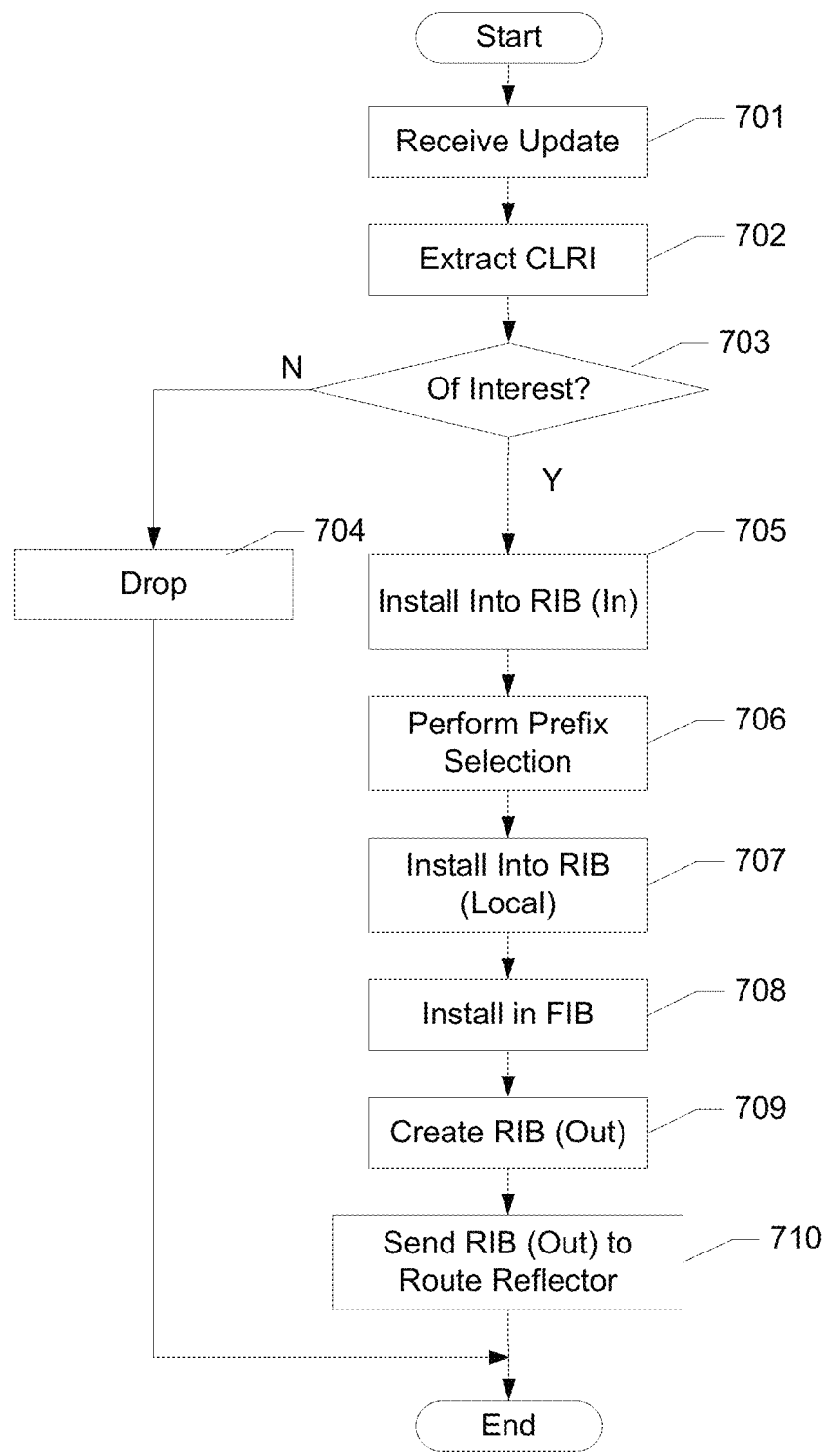
FIG. 7 illustrates an alternative example process for handling announcements.

FIG. 7 illustrates an example process for prefix selection and reannouncement, which can be an alternative or addition to the FIG. 4b process. In step 701, the server may receive an announcement, which can be an update sent from an upstream server in the hierarchy. In step 702, the server may extract a cache layer reachable information (CLRI) value from the announcement. The CLRI can contain data values such as the URI (or BGP community value), the next-hop IP address indicating the next higher server in the hierarchy, and a tier value indicating the tier of that next-hop server.

In step 703, the receiving server can determine whether the received CLRI is one of interest to the server. This determination may be made by comparing the extracted URI (or BGP community value) to a stored list of URIs that the cache server has been configured to service. If the extracted URI is serviced by the receiving server, then the server may check the tier value in the update to determine if the announced tier is higher in the hierarchy (e.g., closer to the origin) than the assigned tier of the server. If the URI is not to be serviced by the server, or if it is serviced but the announcement tier is not higher than the receiving server's tier, then the update announcement is deemed of no interest, and in step 704, the received update can be ignored or dropped, and the process for the current update may end. If the URI is of interest, then in step 705, the server may install the received update into its RIB for intake.

Then, in step 706, the server may perform a prefix selection process. The prefix selection may compare the extracted URI with the other URIs that are already stored in the server's RIB, and find the one that is to be replaced by the extracted RIB. In steps 707 and 708, the server may install the extracted URI into the RIB and FIB, replacing the existing URI (thereby updating it). In some embodiments, it may be possible for the extracted URI to match multiple entries in the RIB. When that occurs, a variety of tiebreaker approaches may be used to determine which entry will be replaced. For example, one tiebreaker may compare the tier values for the entries, and the entry having the lowest level in the hierarchy (e.g., the one farthest from the origin) may be chosen for replacement.

In step 709, the server may then generate a new announcement to send further downstream in the hierarchy (e.g., to be sent to other cache servers that are farther from the origin). In generating this announcement, which can be an outgoing RIB entry, the server may use the original received update announcement, but can replace certain values. It can insert its own IP address instead of the Next-Hop address that was received, and it can insert its own tier value instead of the tier value that was received.

Then, in step 710, the server may send the new announcement out to one or more route reflectors, which can then propagate the announcement to one or more lower level cache servers.

Figure 8:
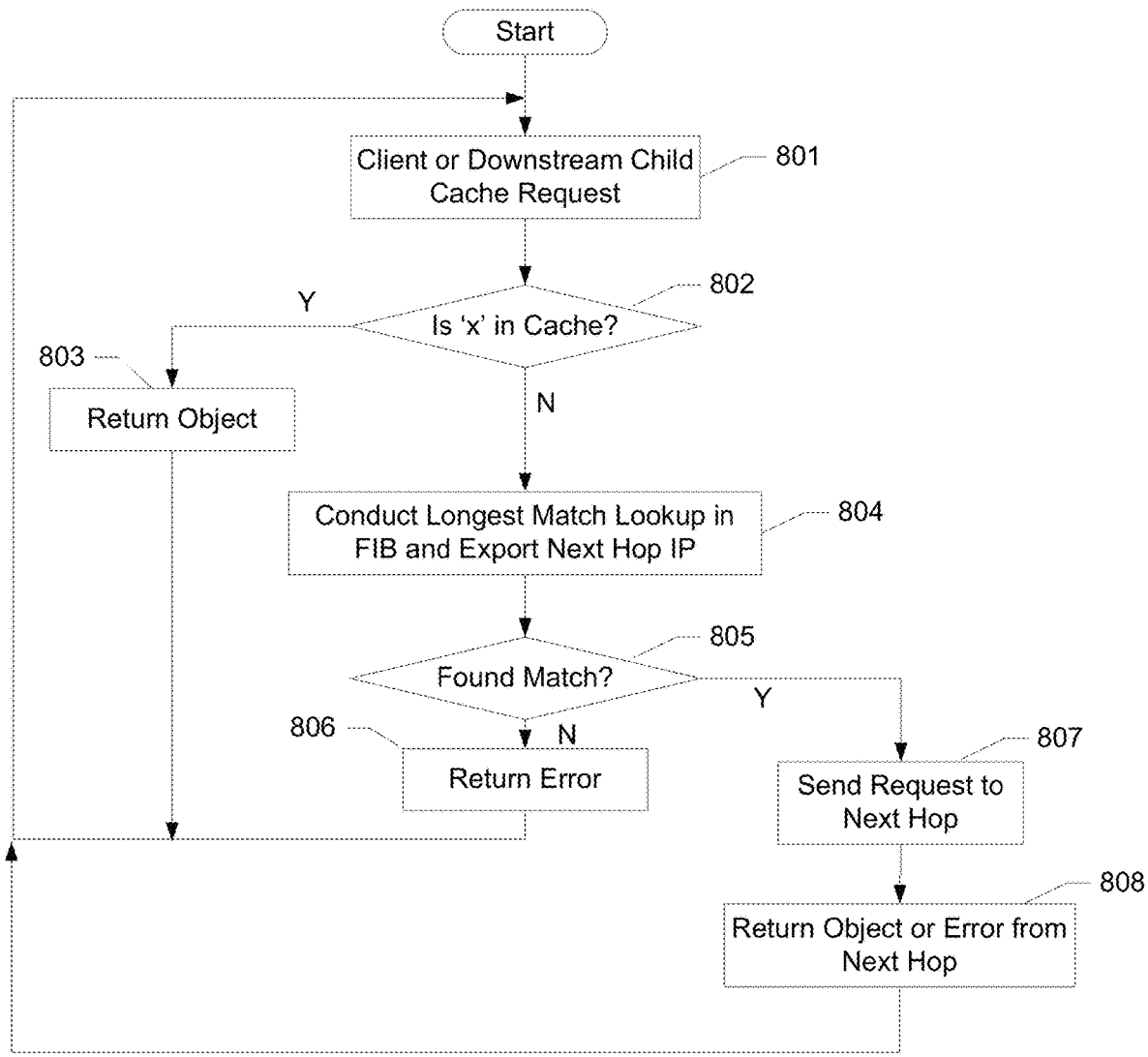
FIG. 8 illustrates an alternative example process for handling client and/or cache requests for content.

FIG. 8 illustrates an example cache hit or miss process, which can occur when a cache server receives a request for content. In step 801, the server may receive a content request from a client or lower-level (child) cache. For example, this request can take the form of an http GET request for a particular content 'x'. In step 802, the server may check to determine whether it possesses or stores the content 'x' in its cache memory. If it does, then in step 803, the server can return the requested content object 'x' to the requesting client or child cache.

If the server did not contain the requested content 'x', then in step 804, the server can consult its FIB to determine what next higher level cache should service the request. To do so, the server can conduct a longest match lookup in the FIB, using the requested content's URI and comparing it to the URIs stored in its FIB. The best matching URI in the longest match routine may match the longest amount of the URI, beginning with the general side of the URI (e.g., if the URI is expressed with decreasing generality in left-to-right order, then the longest match begins from the left and matches the farthest to the right).

In step 805, the server may determine whether any match was found at all. If no match was found at all, then the server can return an error to the requesting client or cache server in step 806. If a match was found, then the longest match can be used in step 807 to generate a request to the next-hop cache in the content's hierarchy. This next-hop request can be formed as another http GET request. From there, the next hop (or an even further next hop) can return either an error or the requested content, and the server can pass this back to the requesting client or cache in step 808. If the content was returned, then the server can also update its own cache memory to store the requested content for use if the content is requested again in the future.

In the discussion above, the terms "domain" and "URI" have been used to assist in describing portions of the hierarchy (or the entire hierarchy). These terms are merely examples, though, and the concepts herein need not be limited to any specific meaning. For example, a URI can be a domain (e.g., http://comcast.net), but a different URI can be just a subset of a domain (e.g., http://a.comcast.net and http://b.comcast.net). An announcement of http://comcast.net may cover specific domains such as http://a.comcast.net. References to a domain above may alternatively reference BGP communities that service a particular domain. For example, an origin may announce a URI (e.g., http:vod.comcast.net/hbo_series) with a BGP community (e.g., "65400:112"). A cache may be configured to carry the BGP community 65400:112, and it may use that value to identify the domain being cached. The origin server for a particular piece of content or domain may be responsible for associating a particular URI with a particular BGP community.

The caches may receive configuration information (e.g., during a configuration process) to identify the BGP communities that it should accept, and where it should be in the tier for that community. For example, a cache's configuration file may resemble the following:

```
Accept community=64500:100
    Tier=42
Accept community=64599:10
    Tier=14
Ignore community=64599:[0-100]
Accept community=64500:*
    Tier=250
Accept community=*:*
    Tier=12
```

In the example above, the cache is configured to accept the community "64500:100," and will be at tier 42 for that community. The cache is configured to ignore community "64599:[0-100]." The bracketed ranges and wildcard characters "*" can be used to identify multiple communities or sub-communities in a single listing.

FIG. 3a illustrates a single origin 300 for a given community, but in some embodiments there can be multiple origins.

In some embodiments, new address family identifiers (AFI) and subsequent address family identifiers (SAFI) can be used to identify information types that are being transmitted. The following types of AFI/SAFI values can be used in some embodiments:

a) AFI 33, SAFI 128 –> cache and origin information (URI –> cache nexthop [unicast IP address] and tier)
b) AFI 33, SAFI 129 –> origin multicast Information (URI –> (s,g)).
c) AFI 33, SAFI 130 –> client IP addresses (used for request -continued routing): client subnet –> service-router IP address
d) AFI 33, SAFI 131 –> URI-x –> URI-y. When cache receives URI "URI-x", it replaces "URI-x" with "URI-y" and then performs a lookup on "URI-y".

In (b), the next-hop can be a multicast source/group (s,g) instead of a single unicast address, and can include a 4-byte value identifying the bandwidth and/or speed of the multicast feed, and this value can be useful to a device that needs hat information for bandwidth allocation or to perform call admission control. In this way, the announcements containing the AFI/SAFI values can be used as a convenient way to signal to devices, such as CMTSs, the amount of bandwidth a particular group will consume, which can be useful for scheduling purposes such as those in DOCSIS. In (d) the next hop can be another URI. Also, the flow in (a) is from parent CDN to child CDN, while the flow of (c) is from child CDN to parent CDN.

In some embodiments, an Internet service provider (ISP) _may lack a CDN or Service Router of its own, and may instead establish a business relationship with another entity's CDN for certain content. The ISP can announce its own client address space to the CDN provider, and the CDN provider can then announce the ISP address space to the CDN provider's parent CDN or other caches in the CDN.

When a child cache wishes to join an existing CDN, the child can identify a plurality of potential parent caches, and can examine each potential parent for a best match. The best match may be based on communication and/or financial cost required for the child to communicate with the proposed parent. The best match may also be based on a cumulative cost for each parent, where the cumulative cost represents the total cost needed for communications between each potential parent and the origin cache (e.g., totaling up intermediate costs in the hierarchy between the potential parent and the origin).

The features above can employ other BGP mechanisms (policy, filtering, etc.), such as Internet Engineering Task Force Secure Inter-Domain Routing (IETF-SIDR) to validate announcements and ensure secure transmission of the URI prefixes.

The namespaces discussed herein have included a format that is from URI to the next hop dotted decimal (e.g., http://abc.com/sports->24.1.2.3), but as an alternative, fully qualified domain names can be used instead of the URI, and can be used as a dynamic way to associate a DNS name with an IP address.

In some embodiments, when a cache announces a URI and itself as the next hop, the cache can also include information identifying the parent caches that are already installed in the cache's FIB for the current URI. By including this information, a receiving server can identify not only the immediate parent sending the announcement, but all other parents as well for the URI, thereby identifying the URI's tree. This information can be useful, for example, if a server wishes to troubleshoot the hierarchy of servers. The receiving server can listen to announcements from the other listed parents as well, as received from the route reflector.

If content is delivered into a cache via the (s,g) mechanism (possibly using the DWOMP protocol), the cache may include in any response headers that this content was delivered into the cache via DWOMP and the specific multicast source and group. This information can identify the path through the CDN that an object took and if multicast was used to deliver the content from the origin to a cache, and that information can be kept with the object in the HTTP response header. This response header field can be as follows: DWOMP-URI=http://abc.com/sports via (24.1.2.3, 232.9.8.7). Such header information can be useful, for example, for a home gateway to learn the association of a URI to a multicast source/group, and reduce the need for another protocol to inform the gateway of this association.

The BGP community mechanism can define the delivery service for some set of URI. At cache configuration time, the cache can define an association between BGP community values and a corresponding tier. There may be a specific delivery service (bgp comm) for hot content—e.g., dedicated caching resources for viral content. Suppose the BGP community for this viral content delivery service is "c:d". An origin is unlikely to know if a portion of its content has gone viral, but the SR would (as it handles request from clients for content). When this occurs, the SR can inject an announcement that is a more specific URI announcement, or overrides an existing origin URI announcement—the purpose being to allow the SR to push this viral content to the viral delivery service or server. For instance, some origin might announce 'http://abc.com" with a nexthop of O1 and a community of "a:b". Suppose there's a surge of request for a subset of this content—http://abc.com/nfl/cba-announced. The SR could therefore originate a new announcement into the CDN: "http://abc.com/nfl/cba-announced" with a nexthop of O1 but a community of "c:d"—community "c:d" is the delivery service for viral content and the SR uses client request information to refine the CDN infra use for "hot" content.

The aggregate minus concept is discussed above, and as noted, an origin can support an entire URI with the exception of a subset of the URI content. The aggregate minus announcement can announce this to the CDN. Caches can consider the "agg minus" as part of their prefix selection— the aggregate URI is used to determine where this announcement ranks in the URI ordering process. When there are multiple announcements that match on identical URIs (normal aggs or agg minus announcements) the logic is to put the aggregate minus announcements before the generic aggregate announcements, so that a top-down search will hit the exception first. When there are multiple aggregate minus announcements, the aggregate minus announcements with the greatest number of "holes" (e.g., greatest number of exceptions) can be put at the top. For instance, if a cache receives the following:

http://abc.com –> origin-42 (classic agg announcement)
http://abc.com minus http://abc.com/news –>origin-19 (agg minus with a single minus prefix)
http://abc.com minus http://abc.com/news minus http://abc.com/sports –> origin-87 (agg minus with two minus announcements)

then these would be put into the RIB and fib in the following order:

1. http://abc.com minus http://abc.com/news minus http://abc.com/sports –> origin-87
2. http://abc.com minus http://abc.com/news –>origin-19
3. http://abc.com –> origin-42

If a client request comes in for http://abc/sports/today, it would conditional match on the aggregate in 1 but then also hit on the minus prefix causing it to fail this match. It would then conditional match on the aggregate in two and since it does not match on the more specific minus prefix, the request would be routed to origin-19. If the request was for http://abc.com/junk, it would match on 1 and be sent to origin-42.

Another feature may be a black hole feature, in which a content provider or CDN operator may wish to cause caches to make certain content URIs unavailable for access. For example, a piece of content may be subject to legal restrictions on when it can be available, or the files can be deemed corrupted. This can be implemented in a variety of ways. First, the CND could announce this URI with a specific community string value that effectively maps this URI to a "null route", or in CDN equivalence, access to the URI would cause the cache server to return an HTTP 4xx or 5xx error indicating the content was either "not found" (404) or otherwise unavailable.

A second approach would be to use the AFI/SAFI (d) mentioned above (URI->URI). In that case, the content owner can announce the following: http://nbc.com/sports/show-42->error://http-error-where "error://http-error-404" is an agreed to signal to that any access to the http://nbc.com/sports/show-42/URI space should return and HTTP error 404 code. Different HTTP error codes could be specified as the second URI value. Error codes or responses could also be at the TCP level: http://nbc.com/sports/show-42->error://tcp-reset, which would cause the cache to instantly reset the TCP connection if content in the nbc.com/sports/show-42 domain was attempted to be accessed. In some embodiments, the black hole feature can be used to implement blackouts of content (e.g., when a local sports franchise refuses to allow its sporting event to be aired in the community of the event if tickets remain available for the event).

In step 410 above, a receiving cache determines whether a received announcement is of interest. In some embodiments, different cache servers may be configured for handling high priority (e.g., very popular content, or "hot" content) or low priority (e.g., old and unpopular content, or "cold" content) content, and announcements may be of interest if they are of the same priority as the cache's configuration. For example, certain very popular content may be in high demand, and the service offering the content may wish to ensure that a certain number of caches are available to serve that content. Those caches may be instructed to only accept announcements for the high priority content. Such announcements may be distinguished from low-priority content by virtue of a BGP community tag. The announcements may use one BGP community tag to indicate high priority content, and another tag to indicate low priority content, and the various caches may be configured to only accept the announcements for their priority level. In this way, caches may be segregated to handle different types of content, and the BGP community tag may be used to carry out the separation. Multiple BGP community values may be defined and used to identify different logical priorities of content, and the various caches may be configured to accept announcements (and, by extension, service the requests) for content having the corresponding priority.

The various features described above are merely nonlimiting examples, and can be rearranged, combined, subdivided, omitted, and/or altered in any desired manner. For example, features of the servers can be subdivided among multiple processors and computing devices. The true scope of this patent should only be defined by the claims that follow.

We claim:

1. A method comprising:
   determining, by a computing device, a first value indicating a position, within a caching system, of the computing device relative to a server, wherein the caching system comprises a plurality of cache devices having respective values indicating respective positions relative to the server;

receiving, from a cache device of the plurality of cache devices, information indicating:
an identifier associated with a content item,
an address for the cache device, and
a second value indicating a position, within the caching system, of the cache device relative to the server;

determining, based on a comparison of the first value with the second value, that the cache device is closer, within the caching system, to the server than the computing device is to the server;

based on the determining that the cache device is closer to the server than the computing device is to the server, storing the received information;

receiving a request associated with the identifier; and
routing, based on the identifier and the stored information, the request to the cache device.

2. The method of claim 1, wherein the identifier is a text or alphanumeric string that is not a fully qualified domain name.

3. The method of claim 1, further comprising mapping the identifier with a corresponding routable address.

4. The method of claim 1, wherein the receiving the information comprises receiving a border gateway protocol (BGP) announcement message that comprises the information, wherein the BGP announcement message further comprises a BGP announcement community tag, and
wherein the method further comprises segregating the plurality of cache devices into priority groups based on the BGP announcement community tag.

5. The method of claim 1, further comprising sending, by the computing device, a first announcement message indicating a first domain, supported by the computing device, and a sub-domain of the first domain not supported by the computing device.

6. A method comprising:
determining, by a computing device, a first value indicating a position, within a caching system, of the computing device relative to a server, wherein the caching system comprises a plurality of cache devices having respective values indicating respective positions relative to the server;

receiving, from a cache device of the plurality of cache devices, information indicating:
an identifier,
an address for the cache device,
a community tag, and
a second value indicating a position, within the caching system, of the cache device relative to the server;

based on a comparison of the community tag to a priority setting of the computing device, storing the received information; and causing, based on the community tag, segregating of the plurality of cache devices into a plurality of priority groups.

7. The method of claim 6, further comprising:
determining, based on a comparison of the first value with the second value, that the cache device is closer, within the caching system, to the server than the computing device is to the server, wherein the storing the received information is further based on the determining that the cache device is closer to the server than the computing device is to the server;
receiving a request associated with the identifier; and routing, based on the identifier and the stored information, the request to the cache device.

8. The method of claim 6, further comprising rearranging, in the stored information, components of the identifier.

9. The method of claim 6, wherein the identifier is a text or alphanumeric string that is not a fully qualified domain name.

10. A non-transitory computer-readable medium storing instructions that, when executed, cause:
determining, by a computing device, a first value indicating a position, within a caching system, of the computing device relative to a server, wherein the caching system comprises a plurality of cache devices having respective values indicating respective positions relative to the server;

receiving, from a cache device of the plurality of cache devices, information indicating:
an identifier associated with a content item,
an address for the cache device, and
a second value indicating a position, within the caching system, of the cache device relative to the server;

determining, based on a comparison of the first value with the second value, that the cache device is closer, within the caching system, to the server than the computing device is to the server;

based on the determining that the cache device is closer to the server than the computing device is to the server, storing the received information;

receiving a request associated with the identifier; and
routing, based on the identifier and the stored information, the request to the cache device.

11. The non-transitory computer-readable medium of claim 10, wherein the instructions, when executed, further cause segregating the plurality of cache devices into priority groups based on community tags.

12. The non-transitory computer-readable medium of claim 10, wherein the instructions, when executed, further cause rearranging, in the stored information, components of the identifier.

13. The method of claim 1, wherein the received information further comprises a next-hop address.

14. The method of claim 1, further comprising:
receiving, from a second cache device of the plurality of cache devices, second information indicating a third value indicating a position, within the caching system, of the second cache device relative to the server;
determining, based on a comparison of the third value with the first value, that the second cache device is farther away, within the caching system, from the server than the computing device is from the server; and
based on the determination that the second cache device is farther away from the server than the computing device is from the server, not storing the second information.

15. The method of claim 1, further comprising:
forwarding the received information to a second cache device of the plurality of cache devices.

16. The method of claim 1, further comprising:
determining, by the computing device, a sub-domain, of the content item, that the computing device does not handle; and
sending, to a second computing device, an indication of the sub-domain.

17. The non-transitory computer-readable medium of claim 10, wherein the instructions, when executed, further cause:

receiving, from a second cache device of the plurality of cache devices, second information indicating a third value indicating a position, within the caching system, of the second cache device relative to the server;

determining, based on a comparison of the third value with the first value, that the second cache device is farther away, within the caching system, from the server than the computing device is from the server; and based on the determination that the second cache device is farther away from the server than the computing device is from the server, not storing the second information.

18. The method of claim 1, further comprising determining a third value indicating a position, within a second caching system different from the caching system, of the computing device relative to a second server, wherein the third value is different from the first value.

19. The non-transitory computer-readable medium of claim 10, wherein the information is included in a border gateway protocol (BGP) announcement message.

20. The method of claim 1, wherein the determining that the cache device is closer to the server than the computing device is to the server comprises determining that the first value is greater than the second value.

* * * * *

UNITED STATES PATENT AND TRADEMARK OFFICE
CERTIFICATE OF CORRECTION

| | |
|---|---|
| PATENT NO. | : 11,178,244 B2 |
| APPLICATION NO. | : 13/569692 |
| DATED | : November 16, 2021 |
| INVENTOR(S) | : Field et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1577 days.

Signed and Sealed this
Thirteenth Day of December, 2022

*Katherine Kelly Vidal*

Katherine Kelly Vidal
*Director of the United States Patent and Trademark Office*